United States Patent
Harada et al.

(10) Patent No.: US 9,626,868 B2
(45) Date of Patent: Apr. 18, 2017

(54) OBJECT DETECTION DEVICE

(75) Inventors: Masahiro Harada, Atsugi (JP);
Katsuhiro Sakai, Hadano (JP); Toshiki Kindo, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 713 days.

(21) Appl. No.: 12/831,473

(22) Filed: Jul. 7, 2010

(65) Prior Publication Data

US 2011/0010046 A1  Jan. 13, 2011

(30) Foreign Application Priority Data

Jul. 10, 2009 (JP) ................................. 2009-164009

(51) Int. Cl.
*G05D 1/02* (2006.01)
*G06F 17/10* (2006.01)
(Continued)

(52) U.S. Cl.
CPC ......... *G08G 1/166* (2013.01); *B60K 31/0008* (2013.01); *B60L 3/0007* (2013.01);
(Continued)

(58) Field of Classification Search
CPC ........ B60G 2400/823; B60G 2800/242; B60G 280/965; B60G 280/00; B60K 2310/26; B60K 2350/1084; B60K 2350/1088; B60K 31/0008; B60Q 9/002; B60Q 9/008; B60Q 9/004; B60Q 9/005; B60Q 9/006; B60Q 1/525; B60Q 5/006; B60R 2300/8093; B60R 2021/01013; B60R 21/013;
(Continued)

(56) References Cited

U.S. PATENT DOCUMENTS 5,710,565 A * 1/1998 Shirai ................ B60K 31/0008
340/903
6,025,797 A * 2/2000 Kawai ................ B60K 31/0008
342/175
(Continued)

FOREIGN PATENT DOCUMENTS

JP    2001242242       9/2001
JP    2003-267084 A    9/2003
(Continued)

OTHER PUBLICATIONS

Office Action for U.S. Appl. No. 14/124,171 dated Aug. 5, 2015.
(Continued)

*Primary Examiner* — Jeffrey Shapiro
(74) *Attorney, Agent, or Firm* — Dinsmore & Shohl LLP

(57) ABSTRACT

An object detection device can acquire information of an object in the vicinity of a host-vehicle for appropriate traveling assistance. An object detection device 1 includes a vehicle state detection section 2, an environmental situation acquisition section 3, a road information acquisition section 4, a detection control section 6, and a detection section 7. A host-vehicle state prediction section 61 acquires a target state of a host-vehicle 81. The detection section 7 detects an object. A parameter setting section 63 switches the detection characteristic of the object in the detection section 7 in accordance with the target state.

9 Claims, 10 Drawing Sheets

(51) Int. Cl.

| | | |
|---|---|---|
| G06G 7/78 | (2006.01) | |
| G08G 1/16 | (2006.01) | |
| B60L 3/00 | (2006.01) | |
| B60Q 1/52 | (2006.01) | |
| B60Q 5/00 | (2006.01) | |
| B60Q 9/00 | (2006.01) | |
| B60R 21/013 | (2006.01) | |
| B60R 21/0134 | (2006.01) | |
| B60W 30/08 | (2012.01) | |
| B60T 8/1755 | (2006.01) | |
| B60W 30/095 | (2012.01) | |
| B62D 15/02 | (2006.01) | |
| G01S 13/93 | (2006.01) | |
| G01S 13/94 | (2006.01) | |
| G01S 15/93 | (2006.01) | |
| G08G 3/02 | (2006.01) | |
| G08G 5/04 | (2006.01) | |
| G08G 7/02 | (2006.01) | |
| B60K 31/00 | (2006.01) | |
| B60W 30/16 | (2012.01) | |
| G06K 9/00 | (2006.01) | |
| B60R 21/01 | (2006.01) | |

(52) U.S. Cl.
CPC ............ *B60L 3/0015* (2013.01); *B60Q 1/525* (2013.01); *B60Q 5/006* (2013.01); *B60Q 9/004* (2013.01); *B60Q 9/006* (2013.01); *B60Q 9/008* (2013.01); *B60R 21/013* (2013.01); *B60R 21/0134* (2013.01); *B60T 8/17558* (2013.01); *B60W 30/08* (2013.01); *B60W 30/095* (2013.01); *B60W 30/16* (2013.01); *B62D 15/0265* (2013.01); *G01S 13/93* (2013.01); *G01S 13/94* (2013.01); *G01S 15/93* (2013.01); *G05D 1/0289* (2013.01); *G06K 9/00805* (2013.01); *G08G 1/16* (2013.01); *G08G 3/02* (2013.01); *G08G 5/04* (2013.01); *G08G 5/045* (2013.01); *G08G 7/02* (2013.01); *B60R 2021/01013* (2013.01); *B60R 2300/8093* (2013.01); *B60T 2201/022* (2013.01); *G05B 2219/39082* (2013.01); *G05B 2219/39091* (2013.01)

(58) Field of Classification Search
CPC ............ B60R 21/0134; B60T 2201/02; B60T 2201/08; B60T 2201/081; B60T 2201/10; B60T 2201/024; B60T 8/17558; B60W 30/12; B60W 30/16; B60W 30/08; B60W 30/095; B60W 30/17; B62D 15/026; B62D 15/027; B62D 15/0265; B62D 1/14; G01S 19/51; G01S 2205/003; G01S 2205/005; G01S 13/93; G01S 13/94; G01S 15/93; G01S 17/93; G01S 13/931; G01S 5/0072; G05D 1/0287; G05D 1/0291; G05D 1/0289; G06K 9/00805; G08G 1/207; G08G 1/22; G08G 1/16; G08G 3/02; G08G 5/045; G08G 7/02; G08G 9/02; B60L 3/0007; B60L 3/0015; G05B 2219/39082; G05B 2219/39091; Y10S 367/909; B63B 2733/00; Y10T 74/20834

USPC ...... 701/45, 97, 116, 65, 300–302; 340/436, 340/903; 342/455; 367/909; 280/777
See application file for complete search history.

(56) References Cited

U.S. PATENT DOCUMENTS

| | | | |
|---|---|---|---|
| 6,456,231 B1* | 9/2002 | McEwan | G01S 7/2927 342/159 |
| 6,615,137 B2 | 9/2003 | Lutter et al. | |
| 7,061,373 B2 | 6/2006 | Takahashi | |
| 7,379,813 B2 | 5/2008 | Kubota et al. | |
| 7,409,295 B2* | 8/2008 | Paradie | G06K 9/00805 701/301 |
| 7,441,624 B2* | 10/2008 | Tobata | 180/271 |
| 7,504,986 B2 | 3/2009 | Brandt et al. | |
| 7,940,206 B2* | 5/2011 | Nohara | G01S 7/003 342/159 |
| 8,805,601 B2* | 8/2014 | Aso | B60W 30/10 701/21 |
| 2003/0139883 A1* | 7/2003 | Takafuji | B60R 21/0132 701/301 |
| 2003/0217880 A1 | 11/2003 | Isogai et al. | |
| 2004/0090117 A1* | 5/2004 | Dudeck | B60T 7/22 303/191 |
| 2005/0012602 A1* | 1/2005 | Knoop et al. | 340/435 |
| 2005/0012604 A1 | 1/2005 | Takahashi | |
| 2005/0087381 A1 | 4/2005 | Tobata | |
| 2005/0174222 A1 | 8/2005 | Kikuchi | |
| 2006/0239559 A1* | 10/2006 | Maris | 382/183 |
| 2007/0043491 A1* | 2/2007 | Goerick et al. | 701/41 |
| 2007/0120731 A1* | 5/2007 | Kelly, Jr. | G01S 7/021 342/159 |
| 2007/0233353 A1* | 10/2007 | Kade | 701/96 |
| 2008/0004807 A1* | 1/2008 | Kimura et al. | 701/301 |
| 2008/0024353 A1* | 1/2008 | Schneider | G01S 13/931 342/70 |
| 2008/0030398 A1* | 2/2008 | Nakamura | G01S 7/4865 342/118 |
| 2008/0065328 A1* | 3/2008 | Eidehall et al. | 701/301 |
| 2008/0084283 A1* | 4/2008 | Kalik | 340/435 |
| 2008/0136612 A1 | 6/2008 | Machii et al. | |
| 2008/0140303 A1* | 6/2008 | Hiruta et al. | 701/116 |
| 2008/0300733 A1* | 12/2008 | Rasshofer | G01S 13/42 701/1 |
| 2008/0303696 A1* | 12/2008 | Aso et al. | 340/935 |
| 2009/0024357 A1* | 1/2009 | Aso | B60W 30/10 702/181 |
| 2009/0085800 A1* | 4/2009 | Alland | G01S 7/034 342/25 R |
| 2009/0326819 A1 | 12/2009 | Taguchi | |
| 2010/0001897 A1* | 1/2010 | Lyman | 342/70 |
| 2010/0007728 A1* | 1/2010 | Strauss | B60R 21/0134 348/118 |
| 2010/0010699 A1* | 1/2010 | Taguchi et al. | 701/23 |
| 2014/0303883 A1* | 10/2014 | Aso | B60W 30/10 701/300 |

FOREIGN PATENT DOCUMENTS

| | | |
|---|---|---|
| JP | 2004-085337 A | 3/2004 |
| JP | 2005126006 | 5/2005 |
| JP | 2007279970 A | 10/2007 |
| JP | 2007329762 A | 12/2007 |
| JP | 2006309445 | 1/2008 |
| JP | 2008-040819 A | 2/2008 |
| JP | 2008-046845 A | 2/2008 |
| JP | 2008026985 A | 2/2008 |
| JP | 2008052399 A | 3/2008 |
| JP | 2008126755 A | 6/2008 |
| JP | 2009-053923 A | 3/2009 |
| JP | 2009-122859 A | 6/2009 |
| JP | 2010-023721 A | 2/2010 |
| JP | 2011-048641 A | 3/2011 |
| WO | 03/093857 A2 | 11/2003 |
| WO | WO 2007/102367 * | 9/2007 ............ G08G 1/16 |

OTHER PUBLICATIONS

Office Action for U.S. Appl. No. 14/124,171 dated Jan. 8, 2016.

(56) References Cited

OTHER PUBLICATIONS

Notice of Allowance issued Aug. 9, 2016 in U.S. Appl. No. 14/124,171.
Supplemental Notice of Allowance issued Sep. 19, 2016 in U.S. Appl. No. 14/124,171.

* cited by examiner

OBJECT DETECTION DEVICE

CROSS-REFERENCE TO RELATED APPLICATIONS

This Application claims priority of Japanese Patent Application No. 2009-164009 filed on Jul. 10, 2009, which is incorporated herein by reference.

BACKGROUND OF THE INVENTION

Field of the Invention

The present invention relates to an object detection device that detects an object by using data acquired from a sensing device or the like.

Related Background Art

In recent years, various systems have been provided which have an object detection device which is mounted in a vehicle to detect an object by using data acquired from a sensing device, such as a camera or a radar, and assist traveling of a driver on the basis of information from the object detection device. With regard to such an object detection device, various techniques for detecting an object with high accuracy have been suggested.

For example, Patent Document 1 (JP2007-329762A) describes an object detection device which predicts a region where there may be an object that should be detected from an image pattern of an in-vehicle camera, and attempts to detect the predicted region intensively, thereby improving object acquisition accuracy. In the object detection device of Patent Document 1, object detection accuracy is adjusted in accordance with the image pattern so as to reduce the processing load of the system.

SUMMARY OF THE INVENTION

However, in the object detection device of the related art, the detection accuracy can be adjusted in accordance with the position of the host-vehicle by using data acquired from the image pattern, but adjustment may not be provided in consideration of the behavior of the host-vehicle, that is, the predicted route of the host-vehicle. For this reason, it may be impossible to acquire necessary information for appropriate traveling assistance of the host-vehicle.

An object of the invention is to provide an object detection device capable of acquiring information of an object in the vicinity of a host-vehicle for appropriate traveling assistance.

An aspect of the invention provides an object detection device which is mounted in a vehicle and detects an object in the vicinity of the host-vehicle. The object detection device includes a host-vehicle state prediction unit that acquires a target state of the host-vehicle, a detection unit that detects the object, and a detection characteristic control unit that switches the detection characteristic of the object in the detection unit in accordance with the target state.

Here, the detection characteristic of the object refers to the performance of the detection unit which is determined by a detection rate and an erroneous detection rate. With regard to switching of the detection characteristic of the object according to the target state, the parameters and the like in the single detection unit may be changed in accordance with the target state, or a plurality of detection units having different detection characteristics may be switched in accordance with the target state. The target state of the host-vehicle refers to the position, the target route, or the like of the host-vehicle after a predetermined time.

According to this object detection device, in a situation where there are a plurality of choices regarding the target state of the host-vehicle, the detection characteristic of the object is switched in accordance with the target state of the host-vehicle. Thus, the detection characteristic of the object is switched in accordance with when the host-vehicle travels in a straight line, turns left, turns right, or the like. As a result, information according to the target state of the host-vehicle is acquired, such that it is possible to acquire information of the object in the vicinity of the host-vehicle necessary for appropriate traveling assistance.

The object detection device according to the aspect of the invention may further include a road information acquisition unit which acquires information regarding a road, and a determination unit which determines a possible collision form in the host-vehicle on the basis of the information regarding the road and the target state. The detection characteristic control unit may switch the detection characteristic in accordance with the collision form. The term "information regarding the road" used herein includes position information of a road structure, such as lanes and intersections, and information regarding traffic rules, such as regulations in terms of road structures and traveling priority. Thus, for example, the information that "part of the target route of the host-vehicle is deviated from the traffic rules" can be acquired, and in such a state, it can be determined that the host-vehicle may collide against another vehicle. As a result, it is possible to acquire information of the object in the vicinity of the host-vehicle necessary for preventing the host-vehicle from colliding against another vehicle in a state where the host-vehicle interferes with the route of another vehicle.

In the object detection device according to the aspect of the invention, the detection characteristic control unit may switch the detection characteristic by adjusting a detection rate. That is, the detection characteristic of the detection unit can be set on the basis of an ROC curve which represents the relationship between the detection rate and an erroneous detection rate. In this case, one detection rate is adjusted to switch the detection characteristic. Thus, for example, even when the erroneous detection rate increases, the detection rate increases, or the detection rate decreases to decrease the erroneous detection rate, such that it is possible to switch the detection characteristic of the detection unit in accordance with the behavior of the host-vehicle, that is, the predicted route of the host-vehicle.

In the object detection device according to the aspect of the invention, when a collision form is determined where the host-vehicle interferes with the route of another vehicle, the detection characteristic control unit may switch the detection characteristic such that the detection rate in the detection unit increases. Thus, when the host-vehicle interferes with the route of another vehicle, for example, when the host-vehicle strays to the opposing lane when turning right at the intersection, giving top priority to keeping an eye on another vehicle such that the host-vehicle does not collide against another vehicle which is traveling on the opposing lane, the detection unit can be switched such that the non-detection rate is lower than the erroneous detection rate.

According to the aspect of the invention, it is possible to acquire information of an object in the vicinity of a host-vehicle necessary for appropriate traveling assistance.

DETAILED DESCRIPTION OF THE PREFERRED EMBODIMENTS

Figure 1:
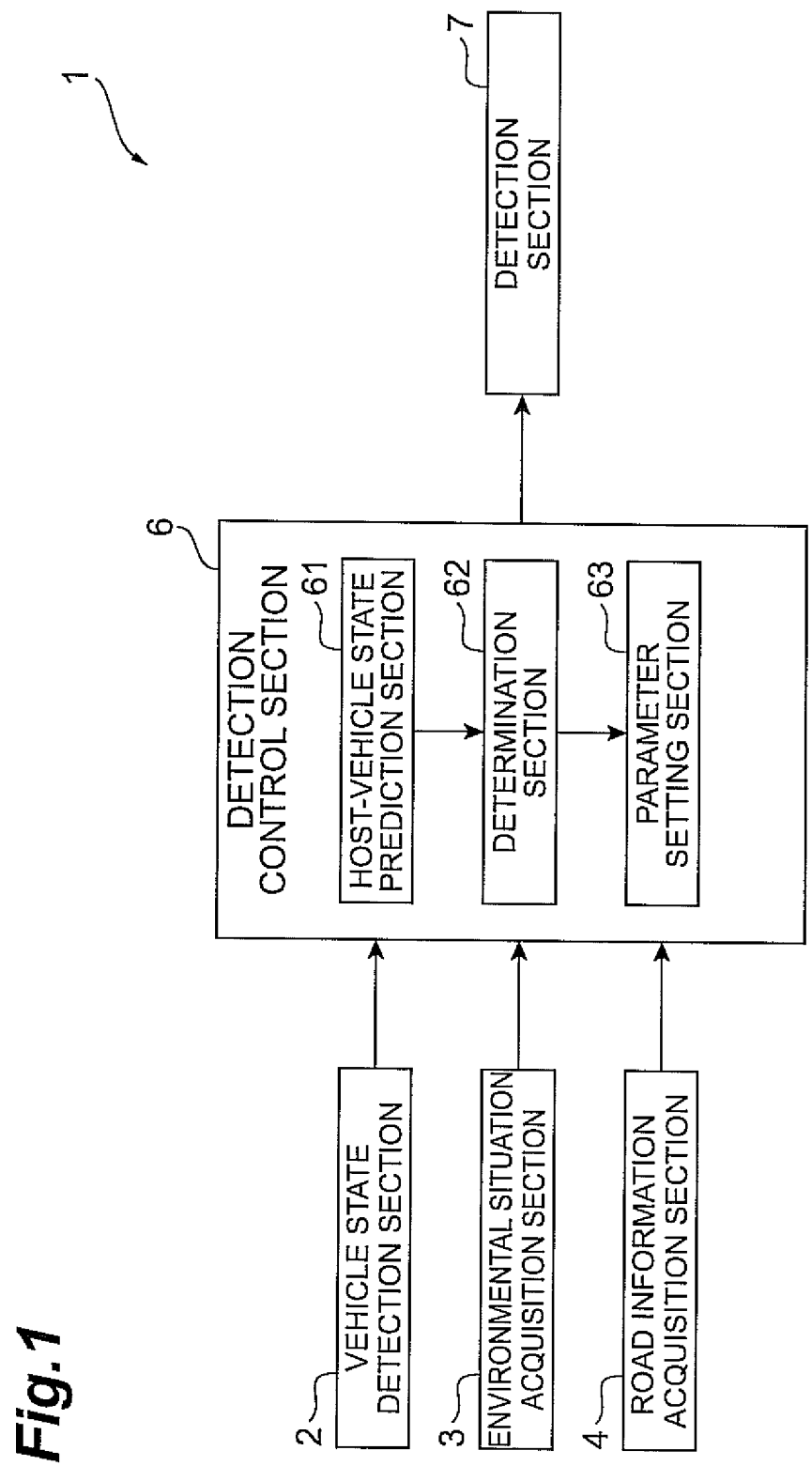
FIG. 1 is a block diagram showing the functional configuration of an object detection device according to an embodiment of the invention.

Hereinafter, an object detection device 1 according to another embodiment will be described with reference to FIGS. 1 to 5. In the description of the drawings, the same parts are represented by the same reference numerals, and overlapping description will be omitted. FIG. 1 is a block diagram showing the functional configuration of the object detection device 1 according to the embodiment of the invention.

As shown in FIG. 1, the object detection device 1 includes a vehicle state detection section 2, an environmental situation acquisition section 3, a road information acquisition section (road information acquisition unit) 4, a detection control section 6, and a detection section (detection unit) 7.

The vehicle state detection section 2 functions as a vehicle state detection unit which detects position information of a vehicle, vehicle speed information, and the like. For the vehicle state detection section 2, for example, a GPS (Global Positioning System), a wheel speed sensor, and the like are used. The GPS acquires position information of the vehicle. The wheel speed sensor is attached to, for example, the wheels of the vehicle, and acquires the wheel speed of the vehicle. The vehicle state detection section 2 is connected to the detection control section 6, and outputs acquired vehicle state information, such as position information and wheel speed information, to the detection control section 6.

The environmental situation acquisition section 3 functions as an environmental situation acquisition unit which acquires environmental situation information in the vicinity of the host-vehicle 81. For the environmental situation acquisition section 3, for example, a vehicle-to-vehicle communication device, a road-to-vehicle communication device, or a radar sensor using millimeter waves or laser is used. When a vehicle-to-vehicle communication device or a road-to-vehicle communication device is used, position information and vehicle speed information of another vehicle 82 can be acquired. When a millimeter-wave radar sensor or the like is used, position information and relative speed information of another vehicle 82 and an obstacle on the route can be acquired. The environmental situation acquisition section 3 is connected to the detection control section 6, and outputs acquired environmental situation information in the vicinity of the host-vehicle 81 to the detection control section 6.

The road information acquisition section 4 acquires road information (information regarding the road) including position information of road structures, such as lanes and intersections, and traffic rules, such as regulations in terms of road structures, traveling priority, and conventional etiquette. The road information acquisition section 4 may acquire road information from a road database stored in a storage section (not shown) mounted in the host-vehicle, or may acquire road information from a database stored in an external server through a communication device. A determination section (determination unit) 62 which will be described below acquire road information to obtain information such as "the position of the host-vehicle is deviated from the traffic rules", for example.

Figure 2:
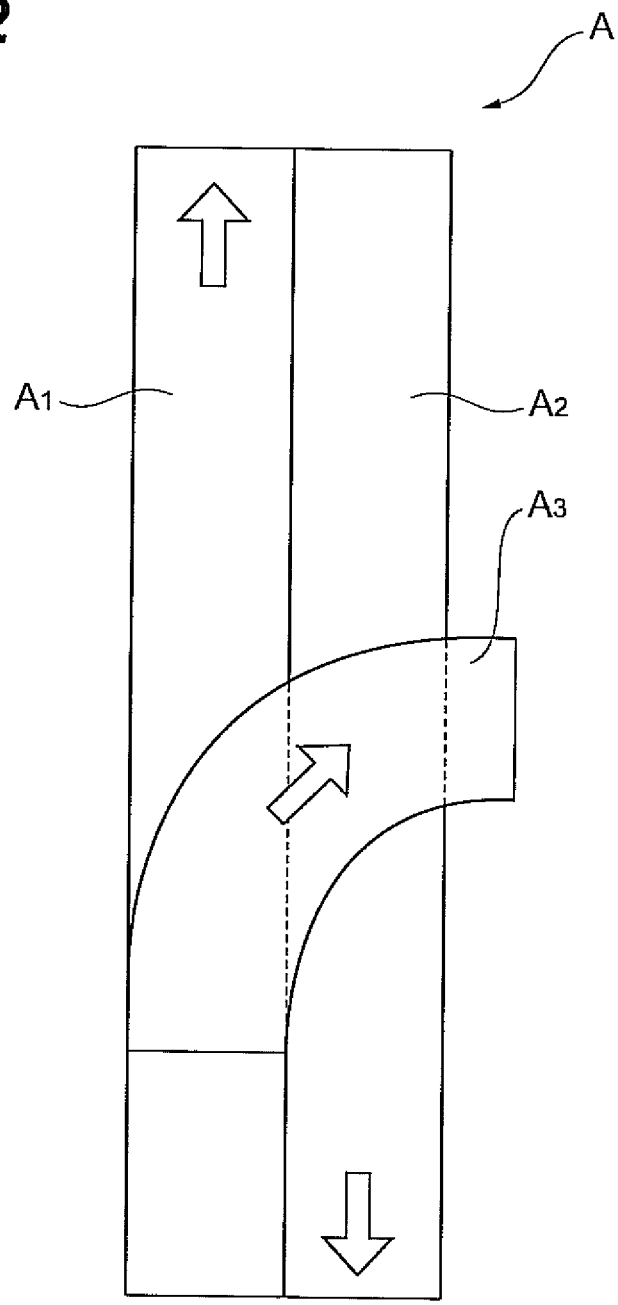
FIG. 2 is a diagram showing an example of road information which is acquired by a road information acquisition section of FIG. 1.

An example of the road database will be described with reference to FIG. 2. FIG. 2 shows an example where the contents of a road database are schematically visualized. The road database outputs traffic rules corresponding to the designated position and time in response to a request from the determination section 62 which will be described below. The contents of the road database are constituted by region information (when a region is represented by a rectangle, the position (X,Y) of each apex), to which the same traffic rule is applied, and the relevant traffic rule. The traffic rule includes the traveling direction of the relevant region, the speed limit, possibility of stopping, presence/absence of a crosswalk, presence/absence of a stop line, and the like. A road shown in FIG. 2 will be described. A road A is defined by three regions {A1, A2, A3}. Then, for example, the region A1 is defined by the traffic rules such that the speed limit is 50 km/h, the traveling direction is the direction indicated by a white arrow in the drawing, stopping is inhibited, there is no crosswalk, and there is no stop line. The road database defines the possibility of transition between the regions A1, A2, and A3. For example, as shown in FIG. 2, it is defined such that transition from the region A1 to the region A2 is inhibited, and transition from the region A2 to the region A1 and from the region A1 to the region A3 is permitted.

The detection control section 6 controls the detection section 7 which will be described below. For example, the detection control section 6 primarily includes a computer having a CPU, a ROM, and a RAM (not shown). The detection control section 6 is connected to the vehicle state detection section 2, the environmental situation acquisition section 3, the road information acquisition section 4, and the detection section 7. The detection control section 6 receives various kinds of information from the vehicle state detection section 2, the environmental situation acquisition section 3, the road information acquisition section 4, and outputs various kinds of information to the detection section 7. The detection control section 6 has a host-vehicle state prediction section (host-vehicle state prediction unit) 61, a determination section 62, and a parameter setting section (detection characteristic control unit) 63.

The host-vehicle state prediction section 61 acquires a target state of the host-vehicle 81. Specifically, the host-vehicle state prediction section 61 predicts the state of the host-vehicle 81 after a predetermined time from position information of the vehicle, vehicle speed information, and the like acquired by the vehicle state detection section 2. The host-vehicle state prediction section 61 exhaustively predicts the position of the host-vehicle 81, and in this case, any methods may be used. The target state of the host-vehicle 81 is preferably acquired as a target route. The term "target route" used herein refers to a concept including temporal elements, such as time, speed, and the like, and is different from the term "route" which does not include the concept of such temporal elements.

The determination section 62 determines a possible collision form in the host-vehicle 81 on the basis of information regarding the road acquired by the road information acquisition section 4 and the target state acquired by the host-vehicle state prediction section 61. Specifically, the determination section 62 determines whether or not the target route predicted by the host-vehicle state prediction section 61 is likely to interfere with the route of another vehicle 82. The determination of whether or not the host-vehicle 81 interferes with the route of another vehicle 82 may be made on the basis of the traffic rule acquired by the road information acquisition section 4.

The parameter setting section 63 switches the detection characteristic of the object in the detection section 7 described below in accordance with the possible collision form acquired by the determination section 62. That is, the detection characteristic, such as the detection rate of the detection section 7, is switched. The detection characteristic of the detection section 7 is determined by an ROC curve which represents the relationship between a detection rate and an erroneous detection rate. In this case, if the detection rate increases, the erroneous detection rate increases, and if the detection rate decreases, the erroneous detection rate decreases. With regard to processing of data (raw data) in the detection section 7, when a template is used, the number of templates increases or decreases, or when a hierarchical template structure is used, a hierarchy to be used changes or the processing cycle changes. Specifically, the parameter setting section 63 adjusts a parameter in an ROC curve which represents the detection characteristic of the object (a curve which represents the relationship between a detection rate and an erroneous detection rate).

Figure 3:
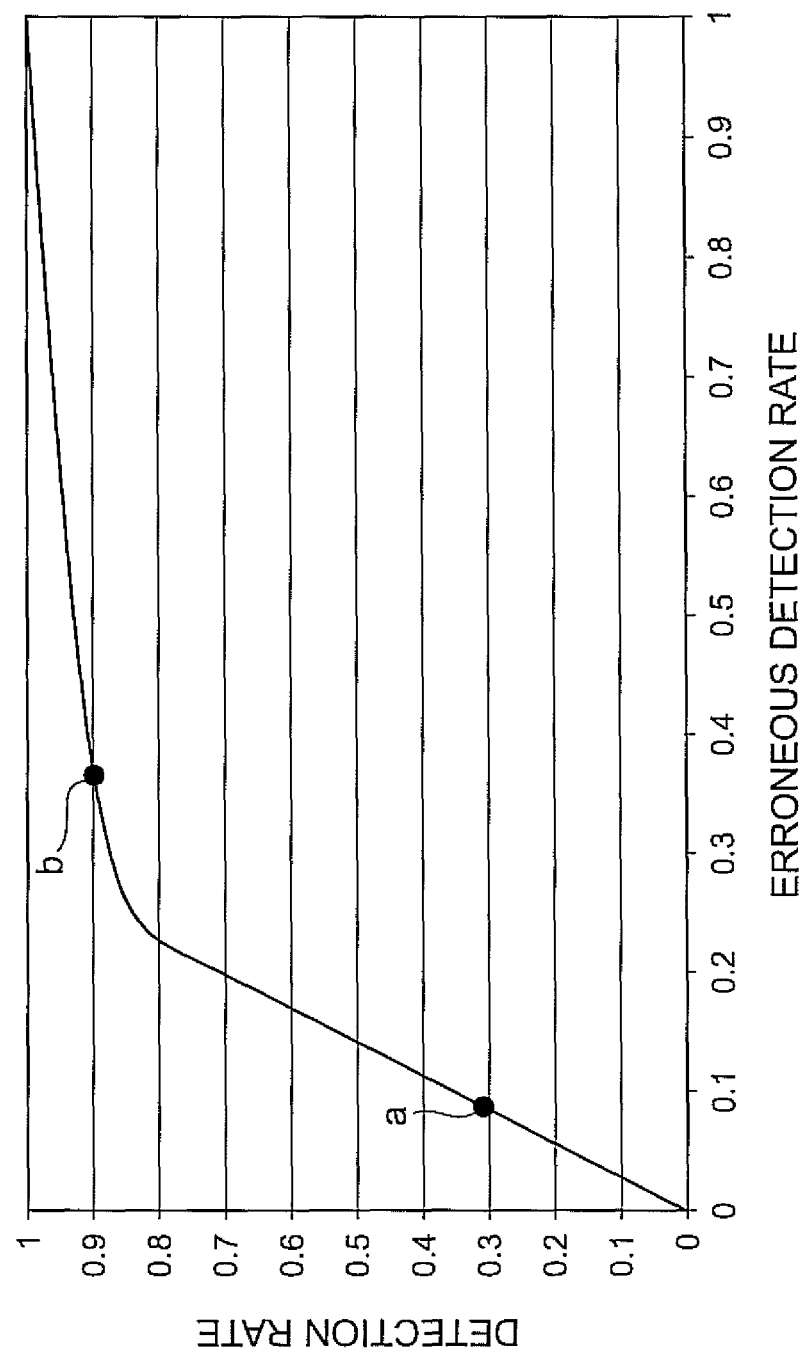
FIG. 3 is a diagram illustrating parameters which are set by a parameter setting section of FIG. 1.

As shown in FIG. 3, the ROC curve is a graph which has the vertical axis representing a detection rate and the horizontal axis representing the erroneous detection rate. The detection characteristic (performance) of all object detectors or discriminators necessary for object extraction can be implemented on the graph. That is, the detection characteristic of the detection section 7 is realized by a single line shown in FIG. 3. When parameters are set to determine an arbitrary point on the line, the detection section 7 can exhibit the performance at the relevant point. For example, a point a shown in FIG. 3 shows a detection characteristic that the detection rate is relatively low (about 0.3) and the erroneous detection rate is also relatively low (about 0.1). Meanwhile, a point b shows a detection characteristic that the detection rate is relatively high (about 0.9) and the erroneous detection rate is also relatively high (about 0.4). When the parameters are set by the parameter setting section 63, the detection section 7 can exhibit the detection characteristic at the point a and the detection characteristic at the point b.

In this embodiment, the difference between the detection characteristics at the points a and b is used. That is, when the host-vehicle 81 is likely to interfere with the route of another vehicle 82, the parameter setting section 63 sets parameters such that the detection characteristic at the point b can be exhibited. When the host-vehicle 81 is unlikely to interfere with the route of another vehicle 82, the parameter setting section 63 sets the parameters such that the detection characteristic at the point a can be exhibited. Thus, when the host-vehicle 81 is likely to interfere with the route of another vehicle 82, even if the erroneous detection rate is high, elimination of detection leakage (non-detection) is directed such that collision can be reliably prevented. Meanwhile, when the host-vehicle 81 is unlikely to interfere with the route of another vehicle 82, even if the detection rate is low, prevention of sudden braking or the like is directed such that an adverse effect on the ride quality can be avoided as much as possible.

The host-vehicle state prediction section 61, the determination section 62, and the parameter setting section 63, which are shown in FIG. 1 and provided in the detection control section 6, may be constituted by loading a program on the computer or may be constituted by individual hardware.

The detection section 7 switches the detection characteristic of the object in accordance with the target state of the host-vehicle 81 to detect the object. For example, a sensing device, such as a camera or a radar, or the like corresponds to the detection section 7. As described above, when the parameters are set by the parameter setting section 63, the detection section 7 switches the detection characteristic of the object.

Figure 4:
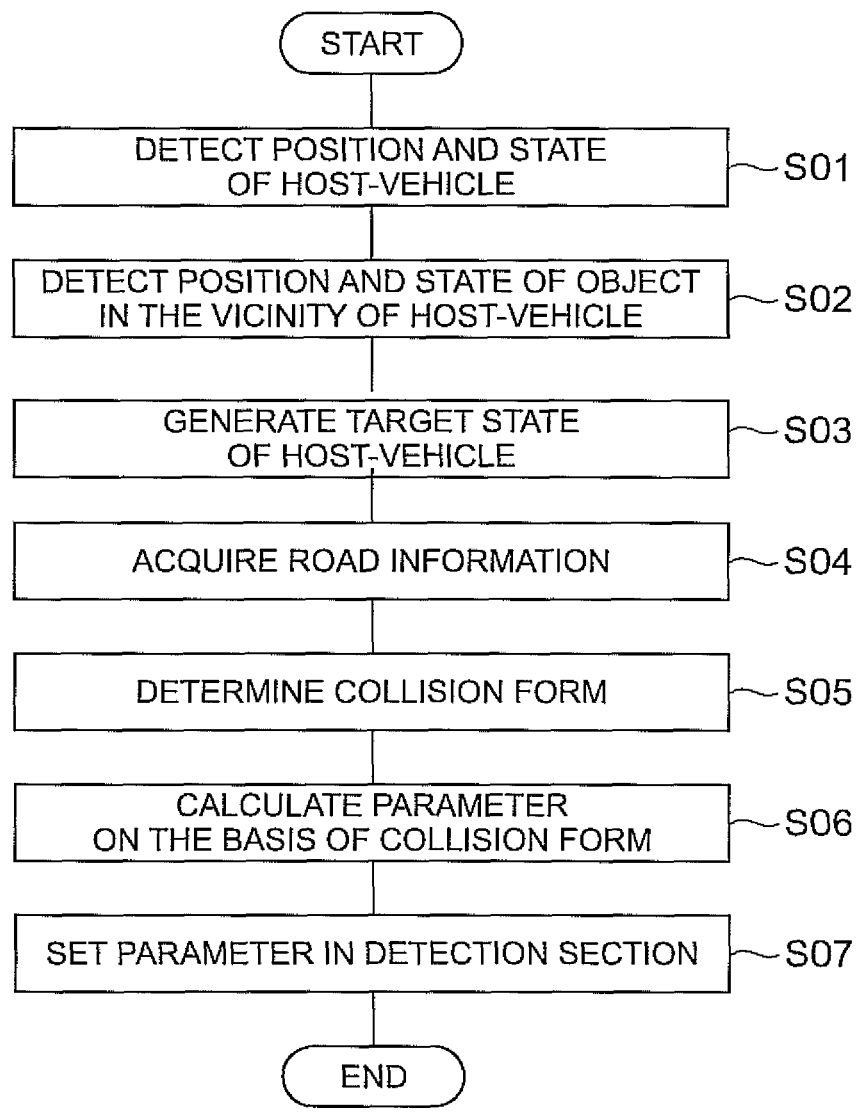
FIG. 4 is a flowchart showing an operation in the object detection device of FIG. 1.

Next, the operation of the object detection device 1 will be described with reference to FIG. 4. FIG. 4 is a flowchart showing a flow of characteristic processing which is executed by the object detection device 1.

First, the vehicle state detection section 2 acquires the state (position, speed, and the like) of the host-vehicle 81 (S01). Then, the vehicle state detection section 2 outputs acquired information to the detection control section 6.

Next, the environmental situation acquisition section 3 acquires the position and state of another object in the vicinity of the host-vehicle 81 (S02), and outputs acquired information to the detection control section 6. Hereinafter, it is assumed that the position of another object is the value of the center of another object, and the state of another object is specified by the position, speed, and the like.

Next, the host-vehicle state prediction section 61 predicts the target state of the host-vehicle 81, such as the future position, speed, direction, and the like, from information regarding the state of the host-vehicle 81, such as the position, speed, direction, and the like, input from the vehicle state detection section 2 (S03). Here, the target state is preferably, for example, target routes w1 and w2 shown in FIG. 5. The target routes w1 and w2 define the time until the host-vehicle 81 reaches each location or a destination, as well as the coordinates (x,y) of a target position.

Figure 5:
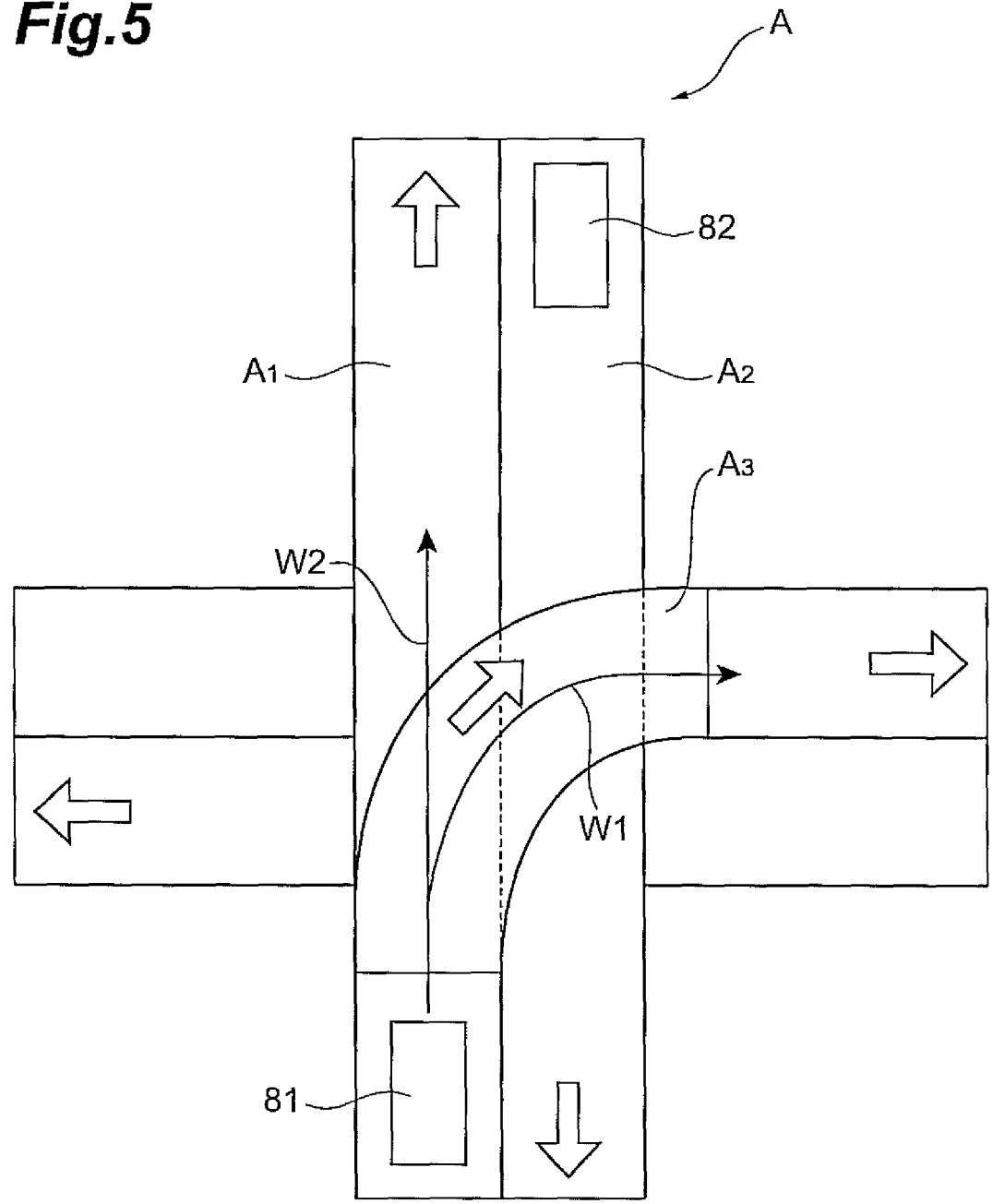
FIG. 5 is a diagram showing road information which is acquired by a road information acquisition section of FIG. 1 and a route which is predicted by a host-vehicle state prediction section.

Returning to FIG. 4, next, the determination section 62 acquires road information including the traffic rules and the like from the road information acquisition section 4 (S04). For example, as shown in FIG. 5, the determination section 62 acquires position information of the regions A1, A2, and A3 of the traveling road, and the priority at the time of traveling in the regions A1, A2, and A3. Here, the following description will be provided assuming that information that "the priority at the time of traveling in the region A2 is higher than the priority at the time of traveling in the region A3" can be acquired.

Next, the determination section 62 determines whether the host-vehicle 81 is likely to interfere with the route of another vehicle 82 or not on the basis of the road information acquired in Step S04 and the target routes w1 and w2 acquired by the host-vehicle state prediction section 61 (S05). When the determination section 62 determines whether or not the host-vehicle 81 is likely to interfere with the route of another vehicle 82, for example, the priorities of the regions A1, A2, and A3 acquired in Step S04 may be used. For example, as shown in FIG. 5, when the host-vehicle 81 collides against another vehicle 82, which is traveling in the region A2, while traveling in the region A3, the target route w1 is determined as a route where the host-vehicle 81 is likely to interfere with the route of another vehicle 82.

Returning to FIG. 4, next, the parameter setting section 63 calculates parameters, which should be set in the detection section 7, in accordance with the collision form acquired in Step S05 (S06). Here, since the target route w1 is determined as a route where the host-vehicle 81 is likely to interfere with the route of another vehicle 82, the parameter setting section 63 calculates parameters which realizes a detection characteristic such that a permissible non-detection rate, that is, an erroneous detection rate increases to eliminate non-detection. Meanwhile, since the target route w2 is determined as a route where the host-vehicle 81 is unlikely to interfere with the route of another vehicle 82, the parameter setting section 63 calculates parameters which realize a detection characteristic such that, even when the detection rate decreases, erroneous detection is eliminated.

Next, the parameter setting section 63 sets the parameters calculated in Step S06 in the detection section 7 (S07). Thus, the detection section 7 can reliably detect another vehicle 82 which is located in the region A2, such that the host-vehicle 81 can be prevented from colliding against another vehicle 82.

As described above, according to the object detection device 1 of this embodiment, as shown in FIG. 5, in the situation where there are a plurality of choices of the target routes w1 and w2 of the host-vehicle 81, the parameters are set which switch the detection characteristic of the detection section 7 in accordance with the target state of the host-vehicle 81. That is, for traveling in a straight line and making a right turn at an intersection shown in FIG. 5, the parameters are set which switch the detection characteristic of the detection section 7. Thus, when the host-vehicle 81 is likely to interfere with the route of another vehicle 82, even when the erroneous detection rate increases, the elimination of detection leakage (non-detection) is directed such that collision can be reliably prevented. Meanwhile, when the host-vehicle 81 is unlikely to interfere with the route of another vehicle 82, even when the detection rate decreases, the prevention of sudden braking or the like due to erroneous detection is directed such that the adverse effect on the ride quality can be avoided as much as possible. As a result, information according to the target state of the host-vehicle 81 is acquired, such that it is possible to acquire information of the object in the vicinity of the host-vehicle 81 necessary for appropriate traveling assistance.

Although the embodiment of the invention has been described, the invention is not limited to the embodiment, and various modifications may be made without departing from the scope and spirit of the invention.

Although, in the foregoing embodiment, an example has been described where the parameters are set by the parameter setting section 63, such that the detection characteristic of the detection section 7 is switched, the invention is not limited to this example.

Figure 6:
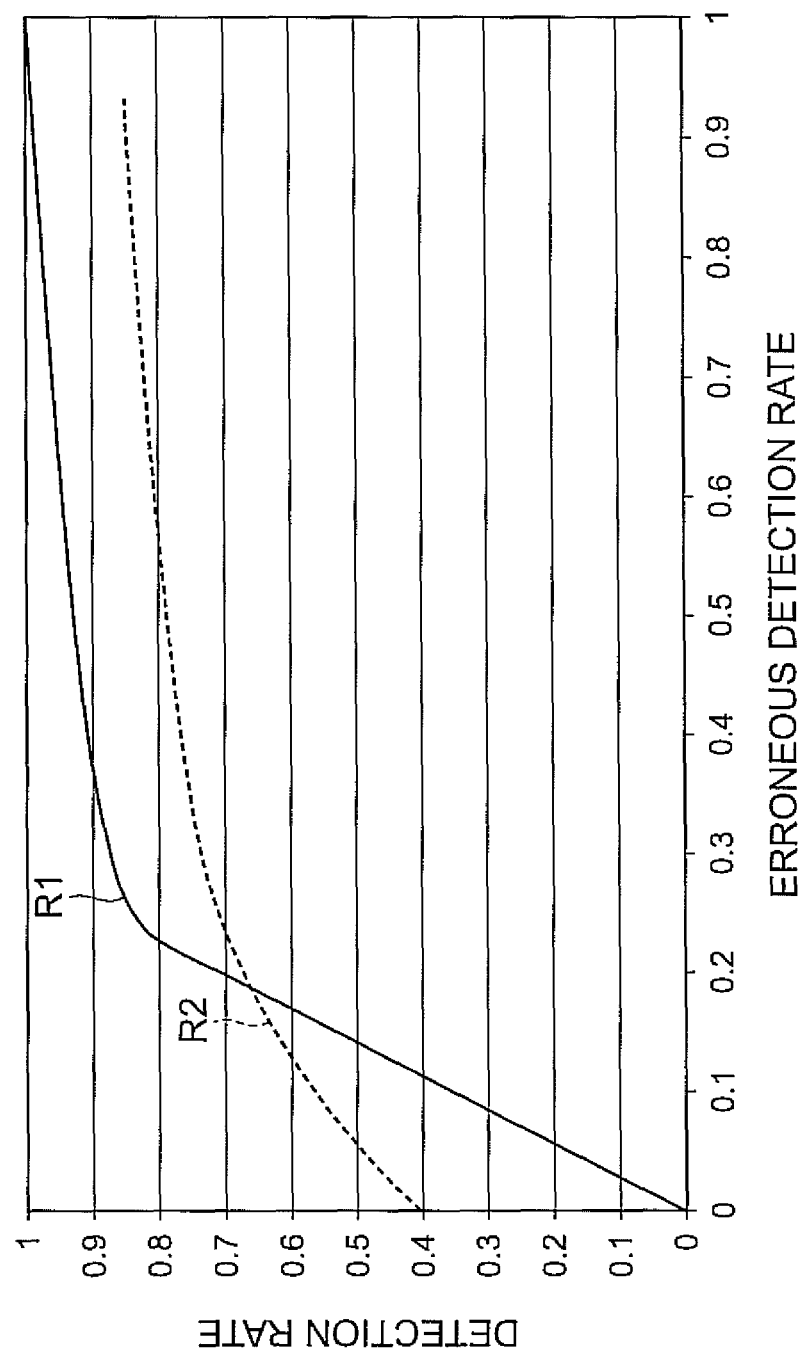
FIG. 6 is a diagram illustrating an ROC curve of a detection section according to another embodiment of the invention.

For example, the parameter setting section 63 may switch ROC curves R1 and R2 shown in FIG. 6 to switch the detection characteristic of the detection section 7. In addition, for example, a plurality of detection sections having different ROC curves (detection characteristics) may be provided. In all of the cases, the detection characteristic of the detection section 7 can be switched in accordance with the target state of the host-vehicle 81.

In the object detection device 1 of the foregoing embodiment, an example has been described where it is determined whether or not the host-vehicle 81 is likely to interfere with the route of another vehicle 82 or not on the basis of the region at which the host-vehicle 81 is located. However, the invention is not limited to this example.

Figure 7:
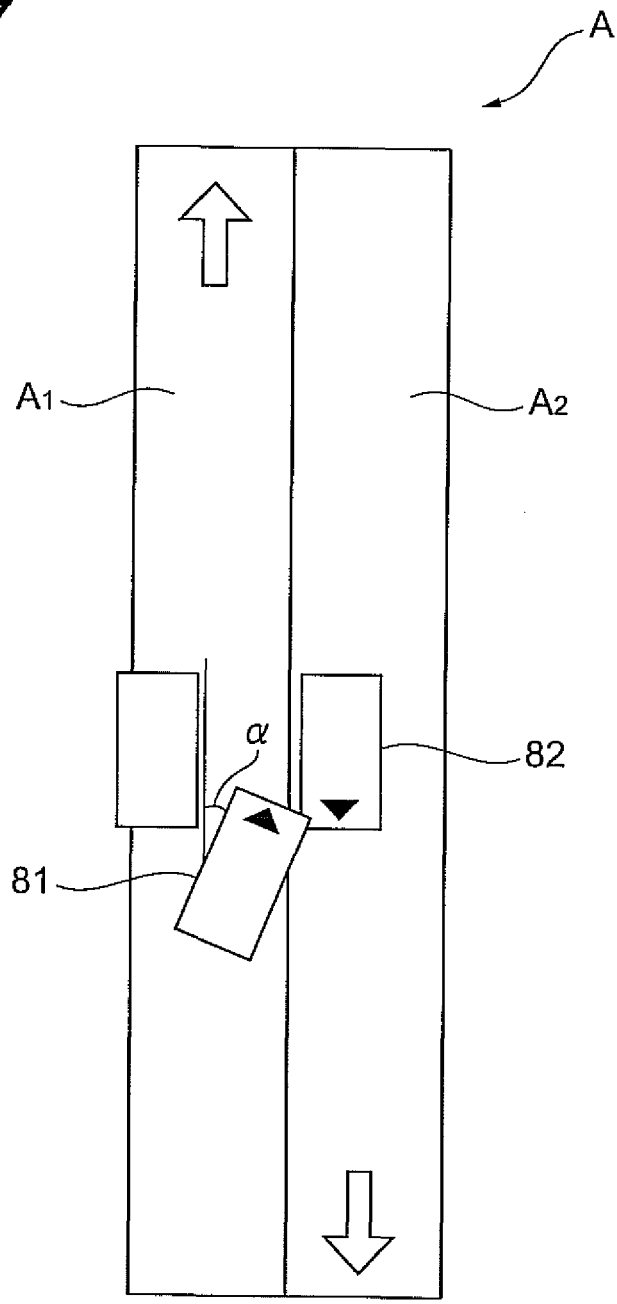
FIG. 7 is a diagram illustrating a probability that a host-vehicle will interfere with the route of another vehicle.

For example, as shown in FIG. 7, it may be determined whether the host-vehicle 81 is likely to interfere with the route of another vehicle 82 or not on the basis of an angle $\alpha$ between the direction of the host-vehicle 81 and the traveling direction of the region A1 where the host-vehicle 81 is located. For example, when the angle $\alpha$ between the direction of the host-vehicle 81 and the traveling direction of the region where the host-vehicle 81 is present is equal to or greater than a predetermined angle (for example, 45°), it may be determined that the host-vehicle 81 interferes with the route of another vehicle 82.

Figure 8:
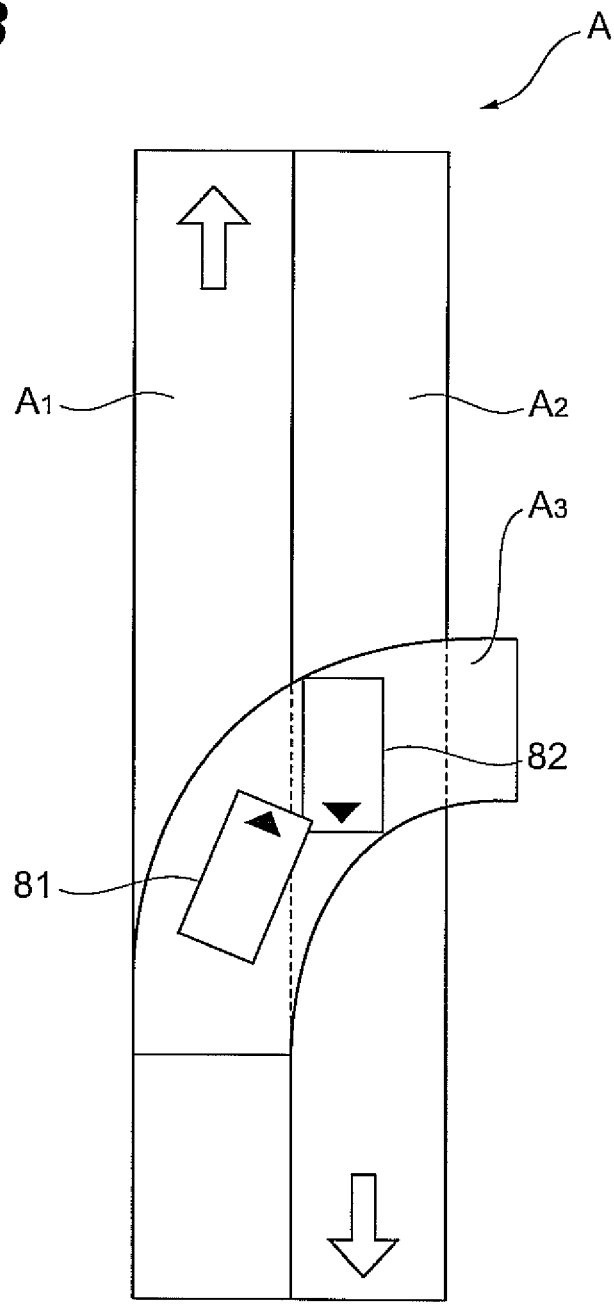
FIG. 8 is a diagram illustrating a probability that a host-vehicle will interfere with the route of another vehicle.
Figure 9:
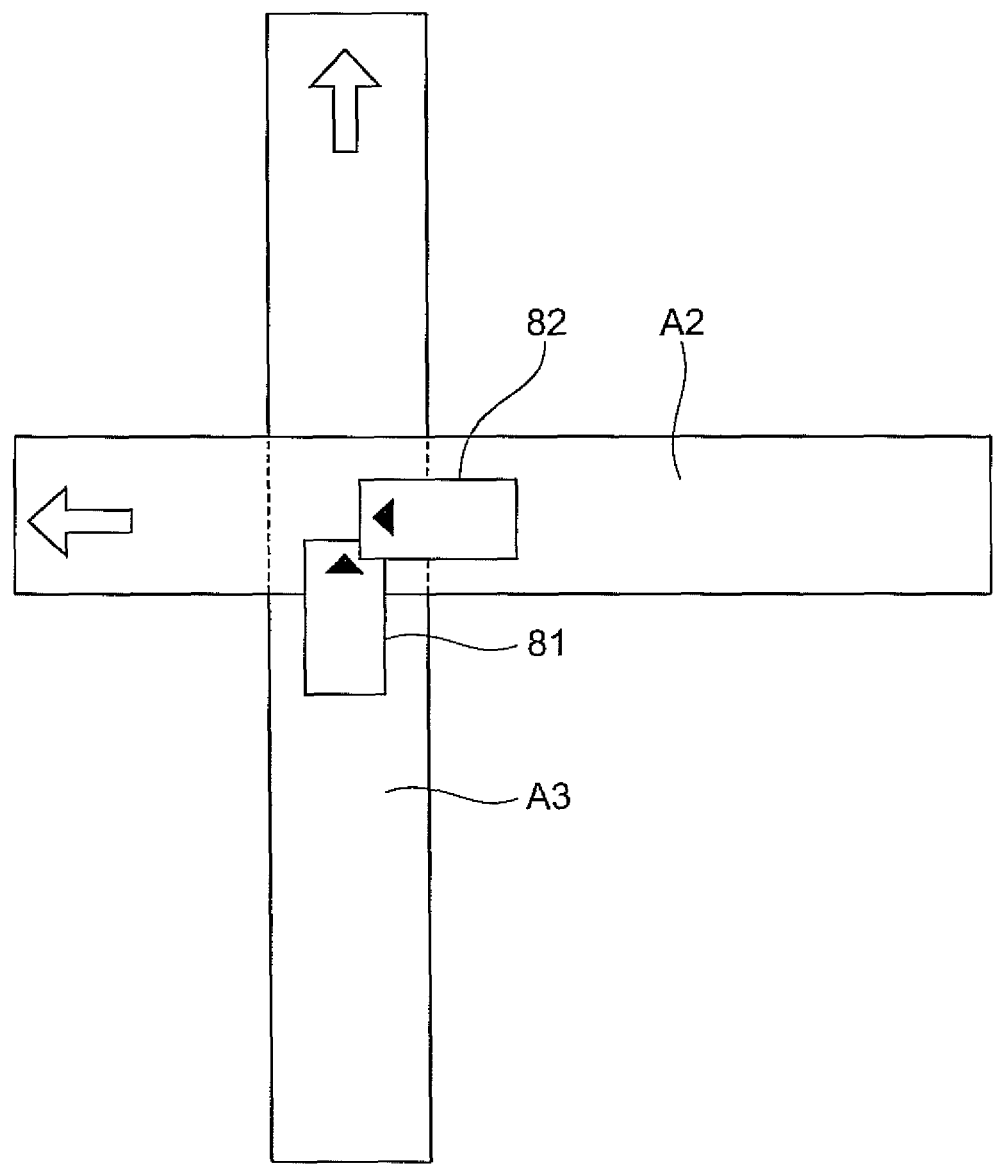
FIG. 9 is a diagram illustrating a probability that a host-vehicle will interfere with the route of another vehicle.

For example, as shown in FIG. 8, it may be determined whether the host-vehicle 81 is likely to interfere with the route of another vehicle 82 or not on the basis of the priority of the region A3 where the host-vehicle 81 is located and the priority of the region A2 where another vehicle 82 is located. For example, when the region A3 where the host-vehicle 81 is located has the priority lower than the region A2 where another vehicle 82 is located, it may be determined that the host-vehicle 81 interferes with the route of another vehicle 82. In comparison of the priorities of the region A3 where the host-vehicle 81 is located and the priority of the region A2 where another vehicle 82 is located, at an intersection shown in FIG. 9, it may be determined whether or not the host-vehicle 81 is likely to interfere with the route of another vehicle 82. The priority based on signal information as well as the priority based on the region where the host-vehicle 81 is located may be used. For example, a vehicle which runs into a green light has high priority, and a vehicle which runs into a red light has low priority.

Figure 10:
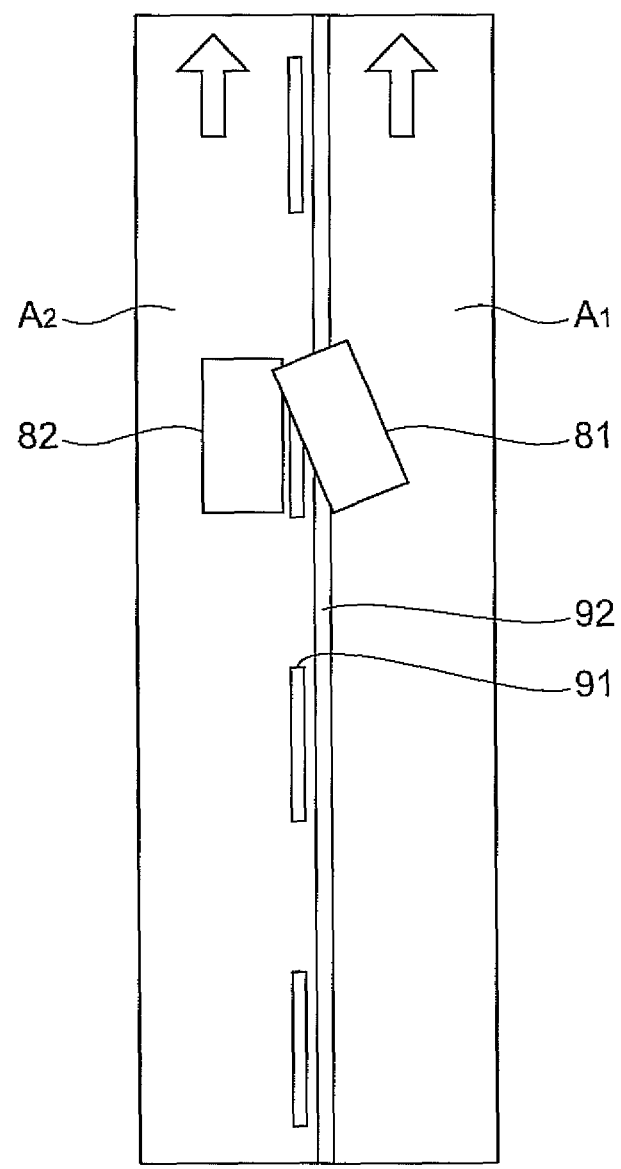
FIG. 10 is a diagram illustrating a probability that a host-vehicle will interfere with the route of another vehicle.

For example, as shown in FIG. 10, it may be determined whether the host-vehicle 81 is likely to interfere with the route of another vehicle 82 or not on the basis of road markings 91 and 92. When the road marking 91 is a white line and the road marking 92 is a yellow line, if the host-vehicle 81 which is traveling in a region A1 changes lane to a region A2, the host-vehicle 81 violates the traffic rule. With regard to such traveling which violates the traffic rule, it may be determined that the host-vehicle 81 interferes with the route of another vehicle 82. For the determination of violations against the traffic rule, road signs as well as road markings may be used.

The determination of interference with the route of another vehicle 82 may be made on the basis of the fault proportion of automobile insurance, the judicial precedents, the vehicle performance, and the like.

The determination of the collision form may be made for collision against a pedestrian or a two-wheeled vehicle, such as a bicycle. In this case, host-vehicle surroundings information including a pedestrian or a bicycle in the vicinity of the host-vehicle is acquired, and it is determined whether or not the route of the host-vehicle is likely to interfere with the pedestrian or the bicycle in the vehicle surroundings information. Then, when it is determined that the route of the host-vehicle is likely to interfere with a pedestrian or a bicycle, since collision of the host-vehicle and the pedestrian or the bicycle is likely to cause extensive damage, a detection characteristic is preferably exhibited such that the erroneous detection rate increases, and the non-detection rate decreases to eliminate non-detection.

The invention claimed is:

1. An object detection device which is mounted in a host-vehicle and detects an object in the vicinity of the host-vehicle, the object detection device comprising:
   a vehicle state detection unit that acquires vehicle state information of the host-vehicle;
   a host-vehicle state prediction unit that predicts a target route of the host-vehicle on the basis of the acquired vehicle state information of the host-vehicle;
   a detection unit that detects the object;
   a road information acquisition unit that acquires information regarding a road including regions wherein a traffic rule applies uniformly in each region;
   a determination unit that determines whether the target route of the host-vehicle corresponds to a first path having a possibility where the target route of the host-vehicle interferes with a route of the object or a second path that does not interfere with the route of the object on the basis of the information regarding the road and the target route of the host-vehicle;
   a detection characteristic control unit that calculates a parameter on the basis of a determination result by the determination unit;
   wherein the detection unit that detects the object uses the calculated parameter of the detection characteristic control unit.

2. The object detection device according to claim 1, wherein the detection characteristic control unit sets a detection rate higher when the target route of the host-vehicle corresponds to the first path, as compared to when the target route of the host-vehicle corresponds to the second path.

3. The object detection device according to claim 1, wherein the detection characteristic control unit calculates the parameter so that non-detection is reduced when the target route of the host-vehicle corresponds to the first path, and the detection characteristic control unit calculates the parameter so that the detection rate decreases when the target route of the host-vehicle corresponds to the second path.

4. The object detection device according to claim 3, wherein the detection characteristic control unit calculates the parameter using a predetermined curve.

5. The object detection device according to claim 3, wherein the detection characteristic control unit switches predetermined curves in accordance with the determination result by the determination unit.

6. The object detection device according to claim 1, wherein the determination unit acquires position information of the regions and priorities in the regions.

7. The object detection device according to claim 1, wherein the determination unit determines whether the target route of the host-vehicle corresponds to the first path or the second path on the basis of an angle between a direction of the host-vehicle and a traveling direction of a region where the host-vehicle is located.

8. The object detection device according to claim 4, wherein the predetermined curve represents the relationship between detection rate and erroneous detection rate.

9. The object detection device according to claim 5, wherein the predetermined curves represents the relationship between detection rate and erroneous detection rate.

* * * * *